(12) United States Patent
Karlin et al.

(10) Patent No.: US 6,447,008 B1
(45) Date of Patent: Sep. 10, 2002

(54) INFLATION DEVICE FOR AUTOMOBILE SAFETY EQUIPMENT

(75) Inventors: Mats Karlin, Vargada; Mats Bohmann, Lerum, both of (SE)

(73) Assignee: Autoliv Development AB, Vargada (SE)

(*) Notice: Subject to any disclaimer, the term of this patent is extended or adjusted under 35 U.S.C. 154(b) by 0 days.

(21) Appl. No.: 09/616,231

(22) Filed: Jul. 14, 2000

(30) Foreign Application Priority Data

Jul. 16, 1999 (DE) .......................... 199 33 556

(51) Int. Cl.[7] ............................... B60R 21/26
(52) U.S. Cl. ...................... 280/741; 280/736
(58) Field of Search ................. 280/736, 737, 280/741; 102/530, 531

(56) References Cited

U.S. PATENT DOCUMENTS

| 5,611,566 A | * | 3/1997 | Simon et al. | 280/736 |
| 5,615,912 A | * | 4/1997 | O'Loughlin et al. | 280/737 |
| 6,029,994 A | * | 2/2000 | Perotto et al. | 280/736 |
| 6,068,291 A | * | 5/2000 | Lebaudy et al. | 280/736 |
| 6,189,926 B1 | * | 2/2001 | Smith | 280/737 |
| 6,231,079 B1 | * | 5/2001 | Perotto et al. | 280/737 |

FOREIGN PATENT DOCUMENTS

JP          10-250525    *  9/1998

* cited by examiner

*Primary Examiner*—Paul N. Dickson
*Assistant Examiner*—David R. Dunn
(74) *Attorney, Agent, or Firm*—Dilworth & Barrese LLP

(57) ABSTRACT

This invention relates to an inflation device for automobile safety equipment with a container in which a charge chamber for acceptance of a gas-producing charge and a discharge chamber with a discharge opening for connection with the safety device are provided, where a separating wall with an inside opening separates the two chambers axially from each other and is connected in a fluid-tight manner with a wall of said container by interlocking connecting means. According to the invention, such an inflation device excels through the fact that the connecting means are formed elastically in the axial direction in such manner that, when a predetermined pressure is reached in the charge chamber, they fail elastically and the separating wall is movable in the axial direction in the discharge chamber. The connecting means are released free of any radial expansion of the container wall.

24 Claims, 3 Drawing Sheets

INFLATION DEVICE FOR AUTOMOBILE SAFETY EQUIPMENT

BACKGROUND OF THE INVENTION

This invention relates to an inflation device for automobile safety equipment with a container in which a charge chamber for acceptance of a gas-producing charge and a discharge chamber with a discharge opening for connection with the safety device are provided, where a separating wall with an inside opening separates the two chambers axially from each other, which wall is connected in a fluid-tight manner with a wall of said container by interlocking connecting means.

Such inflation devices are used, for example, in connection with automobile airbags. When the gas-producing charge is ignited, the gas can flow from the charge chamber through the inside opening into the discharge chamber and from there through the discharge opening into the airbag, in order to inflate it.

Conventional inflation devices of this type are, however, in need of improvement in several regards. If, for example, such an inflation device is exposed to high exterior temperatures, as in the case of fires, the temperature rises sharply inside the container as well. This increases the ignition speed of the gas-producing charge, so that an extremely rapid rise in pressure can occur in the charge chamber when the charge is ignited. This results in the risk of the chamber or container bursting and part of the chamber being ejected at high speeds, like projectiles. There is also the risk that hot gas might enter the passenger compartment of the vehicle.

Forming the separating wall between the charge chamber and the discharge chamber of the container wall, thus connecting therewith in a fluid-tight manner through the use of interlocking connecting means, has already been proposed. As shown in FIG. 4, the container wall has previously been pressed radially inward for this purpose, in the style of a depression, so that the resultant projection on the interior of the wall penetrates into a complementary annular recess on the exterior circumference of the separating wall, i.e., the connecting means were formed as a crimp in the container wall. With this known connection, the separating wall was able to release at very high pressures in the charge chamber and move into the discharge chamber, while the gas arising in the charge chamber could flow directly through the discharge opening, i.e., without taking the detour through the inside opening in the separating wall. However, as shown in FIG. 4, the container wall expanded radially so that cracks could form in it and hot gas could escape into the passenger compartment. Furthermore, with this known connection, the pressure in the charge chamber at which the connection with the separating wall would fail could not be predicted precisely. Accordingly, there was a risk that the container rather than the separating wall would fail at some other point and burst, resulting in the problems mentioned above again.

SUMMARY OF THE INVENTION

This invention therefore relates to an improved inflation device of the type mentioned that avoids the disadvantages in the known state of the art. In particular, increased safety is to be achieved by simple means.

According to the invention, this is solved with an inflation device of the type cited at the beginning, in that the connecting means are preferably formed in the axial direction such that they fail axially when a predetermined pressure is achieved in the charge chamber, and the separating wall is movable in an axial direction in the discharge chamber.

The connecting means are therefore released at excessively high pressures in the charge chamber, free from any radial expansion of the container wall. The interlock between the separating wall and the container wall can be released by axial deformation of the connecting means so that the separating wall is released and can release the pressure in the charge chamber such that a direct connection is created between the charge chamber and the discharge opening of the discharge chamber. A theoretical deformation zone is therefore provided to achieve axial elasticity. This ensures that the gas produced always flows to the destination provided for it, i.e., through the discharge opening, and does not penetrate uncontrolled into the passenger compartment. The elasticity of the connection between the separating wall and the container wall further impedes bursting of the inflation device.

In a further development of the invention, the separating wall or the connecting means on the side of the separating wall is formed elastically. The connection between the separating wall and the container wall can be released without deformation of the container wall. This prevents the risk of cracks in the container wall. Preferably, the connecting means are formed as a flanged connection that has a container flange pointed radially inward and a separating wall flange pointed radially outward, working together with the former. Here, the separating wall flange in particular is formed elastically in the axial direction, to achieve mobility of the separating wall under excessive pressure in the charge chamber.

Preferably, the container flange can be formed in one piece with the container wall; in particular, it is formed as a embossed bead or flange in the container wall, projecting inward. Correspondingly, the separating wall flange can be formed in one piece with the separating walls; in particular it is formed as a ring-like ridge, projecting perpendicular to the axial direction at the exterior circumference of the separating wall. When the predetermined critical pressure is reached in the charge chamber, the radially-projecting separating wall flange is bent or deformed so that the separating wall can be moved axially past on the container flange. Preferably, the separating wall flange is shaped in such manner that it fails at a charge chamber pressure on the order of about 800 bars. In contrast to this, it was difficult to predict the pressure at which the connection would fail with previous separating wall connections; there was a range of variation in pressure on the order of $10^3$ bars.

Expediently, the discharge opening of the discharge chamber has a larger cross-section than the inside opening in the separating wall. Due to the larger discharge opening, the pressurized gas can discharge rapidly. Preferably, the discharge opening and the discharge chamber are formed in the container wall and pointed radially outward. The gas flows in a radial direction outward from the container. A particularly compact arrangement of the inflation device can be achieved due to this arrangement of the discharge opening.

According to a preferred embodiment of the invention, the charge chamber is delimited on the side opposite the separating wall by an exterior wall, also placed approximately vertical to the axial direction of the container, which wall is formed separately from the container wall and connected therewith by a fluid-tight connecting means. Such an exterior wall permits the gas-producing charge to be inserted simply into the charge chamber and then to be sealed by joining the exterior wall. In a further development of the invention, the connecting means for the exterior wall are formed more rigidly than the connecting means for the separating wall, i.e., the connection for the exterior wall withstands a greater gas pressure in the charge chamber than the connecting means for the separating wall. The hot gas from the charge chamber always flows off through the discharge opening of the discharge chamber. Before reaching the resistance of the exterior wall or its connection to the container wall, the separating wall fails, so that the gas can expand through the discharge opening. The exterior wall cannot be exploded away.

Preferably a flange connection is provided for the exterior wall that incorporates an exterior wall flange, pointed radially outwards, and a container flange, pointed radially inwards, working together with the former. The exterior wall flange is more rigid and thicker than the separating wall flange.

To be able to accept the pressure in the charge chamber, the separating wall as well as the exterior wall are expediently arranged with their flanges between the related container flanges, i.e., on the side of the container flange inside the charge chamber.

According to a preferred embodiment of the invention, both the separating wall and the exterior wall are mounted in both axial directions on the container wall. The connecting means for the separating wall and the exterior wall are formed to interlock in both axial directions with the container wall. Preferably, two flanges each, in the form of radially-projecting circumferential ring-like ridges, are provided on the exterior circumference of the separating wall and the exterior wall, between which the related container flange is accepted sandwich-like. The connection can be created simply by inserting the separating wall or the exterior wall into the corresponding point in the container and pressing the container wall in from the outside at the corresponding point, which is in a ring shape, in the style of a depression, so that the bead on the inside of the container wall comes to lie between the two flanges of the separating wall or the exterior wall. The resultant connection is, for one thing, fluid-tight, and for another, has no play in the axial direction. In place of the two flanges on the separating wall or the exterior wall, an additional flange projecting inward could also be applied to the container wall, so that the corresponding separating wall flange or exterior wall flange is enclosed sandwich-like between the two container flanges. In the case of the above-described embodiment, however, fewer deformations of the container wall are necessary, which has a positive impact on its resistance.

Another preferred embodiment of the invention consists in the fact that, in addition to the charge chamber and the discharge chamber, a pressure chamber is provided for compressed gas, which chamber can be connected to the discharge chamber by means of a connecting opening. The connecting opening is first sealed fluid-tight with a releasable seal. The seal is preferably formed and arranged in such manner that it is opened by gas pressure in the charge chamber after ignition of the gas-producing charge and releases the connecting opening. To actuate the seal, a piston-cylinder unit can be provided, the piston of which is can be impinged upon by gas pressure and driven through the connecting opening. The piston here presses on the seal on the connecting opening. Preferably the seal on the connecting opening can be opened by a stopper that serves as the seal for the inside opening. This stopper can be placed in a releasable manner on or in the inside opening and seals it fluid-tight; the stopper is pressed out of the inside opening by gas pressure into the charge chamber and can be driven through the connecting opening between the pressure chamber and the discharge chamber so that it can thus open the connecting opening as well. Expediently, the inside opening is formed essentially cylindrically on the side facing the pressure chamber so that the stopper can be inserted in the style of a piston intro the inside opening.

To be able to achieve a defined, controlled collapse of the separating wall between the charge chamber and the discharge chamber with excess pressure in the charge chamber, the separating wall, in a further development of the invention, is supported on a separating wall that divides the pressure chamber from the discharge chamber. The separating wall between the discharge chamber and the pressure chamber can be formed as the floor of the container and in one piece therewith, resulting in great stability. The walls delimiting the pressure chamber are preferably formed separately and connected fluid-tight, especially welded, with the walls of the discharge chamber.

To support the separating wall between the charge chamber and the discharge chamber, a symmetrical guide is preferably provided on the longitudinal axis of the container, which guide is distanced radially from the container wall and supports the separating wall inside its fastening to the container wall. The support or guide is formed by a deformation that changes the length. It forms a deformable or damping element that is flattened upon movement of the separating wall as a result of the gas pressure in the charge chamber. A theoretical deformation zone is preferably provided for this on the guide.

To achieve a compact structure for the inflation device, the container can be formed essentially as a cylinder, particularly a circular cylinder, and the chambers can be arranged concentrically, one after the other, insider the container along the cylinder axis. The discharge chamber preferably lies between the charge chamber and the pressure chamber. The arrangement of the chambers and the openings in the separating walls between the chambers is preferably created in such manner that the gas flow from the charge chamber into the discharge chamber and the gas flow from the pressure chamber into the discharge chamber are pointed in opposition to each other.

BRIEF DESCRIPTION OF THE DRAWINGS

These and additional features can be derived from the following description and the related drawings. Based on these, one preferred embodiment of the invention is explained in greater detail. The drawings show.

DESCRIPTION OF THE PREFERRED

Figure 1:
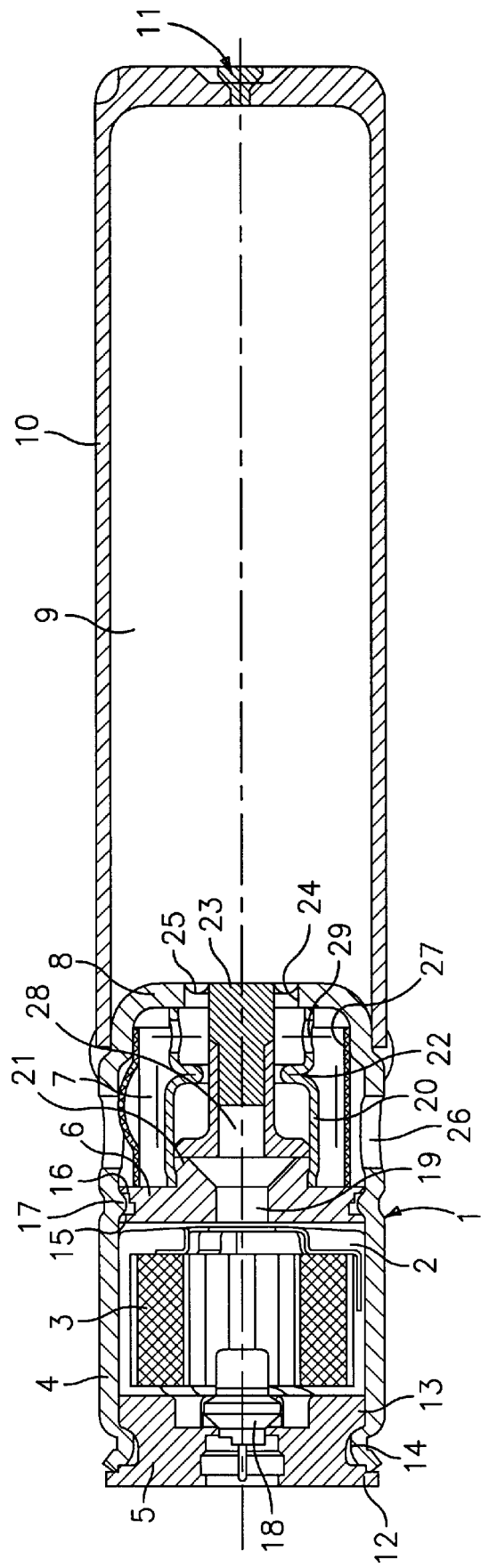
FIG. 1: a cross-section through the longitudinal axis of an inflation device of the hybrid type, according to a preferred embodiment of the invention.

The inflation device has an essentially cylindrical container 1 inside of which several chambers are arranged.

As the first chamber, a charge chamber 2 is provided at one end of the container 1, which chamber accepts a gas-producing charge 3. The charge chamber 2 is delimited in the radial direction by the cylindrical container wall 4. At the left end of the container 1, open on one side according to FIG. 1, the charge chamber 2 is delimited by an exterior wall 5 which is thrust into the interior space surrounded by the container wall 4 and is connected in a fluid-tight manner with the container wall 4. On the side opposite exterior wall 5, the charge chamber 2 is delimited by a separating wall 6 that extends radially like exterior wall 5 and is also connected in a fluid-tight manner to container wall 4, as explained below in greater detail.

The separating wall 6 simultaneously delimits a second chamber inside the container 1, which is arranged in the axial direction of the container 1, i.e., in its longitudinal direction, behind the charge chamber 2, and forms a discharge chamber for the expanding gas. The discharge chamber 7 is delimited in the axial direction by the container wall 4, in addition to the separating wall 6, and in the axial direction, by another separating wall 8, which separates the discharge chamber 7 from a third chamber that is formed as a pressure chamber 9. In the pressure chamber 9 there is compressed gas that discharges upon actuation of the inflation device as explained below. The pressure chamber 9 is delimited by a bowl-shaped pressure chamber wall section 10, in addition to the second separating wall 8, which section 10 is placed in a fluid-tight manner at the separating wall 8 or the container wall 4 and is connected therewith. As FIG. 1 shows, the wall section 10 of the pressure chamber 9 is welded to the container wall 4. On the floor of the pressure chamber 9 is a filling device 11 to fill the pressure chamber 9 with compressed gas.

The construction of the inflation device is explained below in greater detail:

The exterior wall 5 is formed essentially like a disk; at its exterior circumference it has two exterior wall flanges 12 and 13, distanced from each other, which work together with the related container flange 14. The exterior wall flanges 12 and 13 extend essentially radially, in the style of circumferential ring ridges, perpendicular toward the outside, and between them delimit a groove-like recess running around the exterior circumference surface of the exterior wall 5. As FIG. 1 shows, the container flange 14 is accepted into the circumferential recess between the exterior wall flanges 12 and 13; it fits, fluid-tight, around the exterior wall flange 13 turned toward the charge chamber, in the groove-like recess lying between the two exterior wall flanges 12 and 13. The flank of the exterior wall flange 13, turned toward the container flange 14, is thereby rounded off at the foot of the circumferential recess, so that the container flange 14 can fit well. The container flange 14 can be produced by pressing in the original cylindrical container wall 4. For this, the exterior wall 5 is thrust from the open side of the container into this, until the face of the container wall 4 stands at the outside exterior wall flange 12. With a suitable tool, the container wall 4 is pressed radially inward, in the style of a crimp, between the two exterior wall flanges 12 and 13, so that the container wall 4 forms a bead projecting inward that penetrates into the circumferential recess between the exterior wall flanges 12 and 13.

Similarly, the separating wall 6 between the charge chamber 2 and the discharge chamber 7 is connected with the container wall 4, fluid-tight. The separating wall 6 also has two ring-shaped separating wall flanges 15 and 16, projecting radially perpendicular toward the outside, which are placed at a distance from each other on the exterior circumference of the separating wall 6, which is shaped overall like a circular disk, and which are formed in one unit with the separating wall 6. Between the separating wall flanges 15 and 16, the container flange 17 extends; it projects like a bead toward the inside and runs around the container wall. The container flange 17 is formed as an integral part of this, similar to the container flange 14 on exterior wall 5, by pressing in the originally cylindrical container wall 4.

Both container flanges 14 and 17 are dimensioned and formed in such manner that the exterior wall 5 and the separating wall 6 are held without play and are connected fluid-tight with container wall 4. As FIG. 1 shows, the interior separating wall flange 15, i.e., arranged on the side of the container flange 17 facing the charge chamber 2, is substantially thinner than the opposing exterior wall flange 13. This means the connection of the exterior wall 5 with the container wall 4 is more resistant than the connection between the separating wall 6 and the container wall 4.

The second separating wall 8 between the pressure chamber 9 and the discharge chamber 7 is formed in one piece with the container wall 4 and forms its floor.

Various parts or functional units are arranged inside the chambers. In the charge chamber 2, the gas-producing charge is arranged, and can be thrust inside the container 1 before sealing charger chamber 2 together with the exterior wall 5. An igniter 18 is arranged in a central recess in the exterior wall 5; with its help, the gas-producing charge 3 can be ignited.

An inside opening 19 is created in the separating wall 6 between the charge chamber 2 and the discharge chamber 7, as shown in FIG. 1, which opening has a cylindrical section when seen from the charge chamber 2, connected to which is a spherically expanding section; connecting to the latter is a second cylindrical section, that has essentially the same diameter as the first cylindrical section of the inside opening 19. The second cylindrical section of the inside opening 19 is formed of a tube-shaped opening piece 28 mounted on the front side in the axial direction of the separating wall 6 and projects into discharge chamber 7.

As shown in FIG. 1, the separating wall 6 is supported on the second separating wall 8 by means of a guide piece 20. The guide piece 20 is thrust by means of a ring-shaped shoulder 21 on separating wall 6 projecting into discharge chamber 7, and mounted on separating wall 6. The guide piece 20 is arranged essentially dynamically balanced and concentrically to the longitudinal axis of the container 1. It has a theoretical deformation zone 22, formed as a bead pointed inward. This flange, projecting inward, simultaneously forms a stop for the opening piece 20, particularly for its flange extending outward. The opening piece 20 can be moved away in the axial direction of separating wall 6, as explained below.

The inside opening 19 in the separating wall 6 between the charge chamber 2 and the discharge chamber 7 is sealed by a sealing stopper 23 that is thrust into the tube-shaped opening piece of inside opening 19 and that protrudes with a shoulder on its front. If the sealing stopper 23 is removed, the inside opening 19 in the separating wall 6 can release gas from the charge chamber 2 into the discharge chamber 7.

A connecting opening 24 is likewise closed between the pressure chamber 9 and the discharge chamber 7, which is formed in the separating wall 8 as a recess concentric to the longitudinal axis of container 1 (see FIG. 1). This connecting opening 24 is closed, fluid-tight, by a sealing disk 25, which protrudes over connecting opening 24 in the radial direction and is pressed into the second separating wall 8 by the gas pressure in the pressure chamber 9. The sealing disk 25 lies on the side of the separating wall 8 facing the pressure chamber 9, in the area surrounding connecting opening 24. Furthermore, the sealing disk 25 is supported by the sealing stopper 23, which extends through the connecting opening 24 approximately into the side of the second separating wall 8 facing the pressure chamber 9. The sealing disk 25 lies on the front of the sealing stopper 22 and is held against it.

With ignition of the gas-producing charge 6 in accordance with the regulations, the inflation device works as follows:

The gas quantity resulting from ignition of the charge 3 expands starting from charge chamber 2 through the inside opening 19 in the separating wall 6 and impinges upon the sealing stopper 23. As a result of the gas pressure on the charge chamber 2, the tube-shaped opening piece 28 is guided into the guide piece 20 together with the sealing stopper 23, accepted therein, axially away from the charge chamber 2 toward the connecting opening 24. As soon as the opening piece 28 appears at the shoulder-shaped stop of guide piece 20, the sealing stopper 23 is driven out of the opening piece. The sealing stopper 23 also opens connecting opening 24 here, by pressing on the related sealing disk 25. Thus, for one thing, the gas exiting from the charge chamber 2 through the inside opening 19 can expand into the discharge chamber 7 or the pressure chamber 9 and flow through discharge openings 26 into the safety device, for example, an airbag. The discharge openings 26 are formed in the container wall 4 so that the exiting gas flows radially outward. The discharge openings 26 have a larger cross-section area than the inside opening 19.

To facilitate the expansion of the gas in the discharge chamber 7, the corresponding recess 29 are provided in the guide piece 20 (see FIG. 1). A collar 27 set in the discharge chamber 7 is also formed, in particular, in a mesh-like manner, so that the expanding gas can flow through it into the discharge opening 26.

The compressed gas from pressure chamber 9 likewise flows in the discharge chamber 7, through the connecting opening 24 in the second separating wall 8. The gas expanding from pressure chamber 8 also exits from the discharge chamber 7 through the discharge openings 26. The gas flow entering the discharge chamber 7 from pressure chamber 9 is opposed to the gas stream expanding from the discharge chamber 2 in the discharge chamber 7.

Based on FIG. 2, the method of action of the inflation device is explained below, if the gas-producing charge expands with excessive ignition speed, for example, in charge chamber 2 as a result of the effect of high temperatures, and the pressure resulting in charge chamber 2 exceeds a predetermined value.

For one thing, analogous to the description above, the sealing stopper 23 is driven out of the inside opening 19. Furthermore, however, the connection of the separating wall 6 between the charge chamber 2 and the discharge chamber 7 fails, so that the separating wall 6 can be pressed into the discharge chamber 7 by the gas pressure in charge chamber 2. A direct fluid connection is thus opened from the charge chamber 2 to the discharge openings 26, i.e., the gas ignited in charge chamber 2 can flow through the discharge openings 26 without taking the detour through the inside opening 19.

Figure 3A:
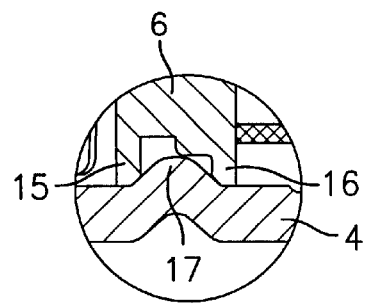
FIG. 3: An enlarged cross-section of a connection of the separating wall to a container wall, in cutaway, where depictions a–c show the connection in various phases of failure.
Figure 4B:
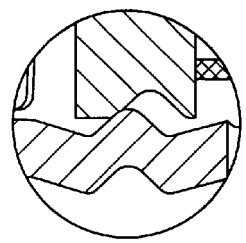
Figure 3B:
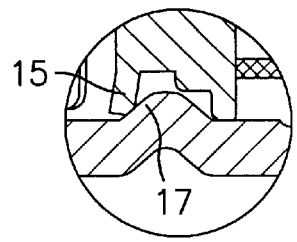
Figure 4C:
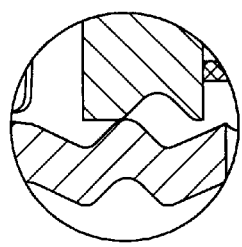
Figure 3C:
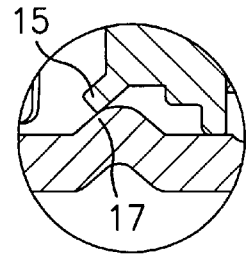

The failure of the connection of separating wall 6 with the container wall 4 can be seen in FIG. 3. If the pressure in the charge chamber 2 exceeds a predetermined value, the interior separating wall flange 15 deforms, i.e., it fails in an axial direction (see FIG. 3b). The separating wall 6 is pressed in the axial direction by the charge chamber pressure so strongly in the direction of the discharge chamber 7 that the first radially perpendicular separating wall flange 15, facing outward, is bent in an axial direction. The separating wall flange 15 is thrust over container flange 17 (see FIG. 3c). Advantageously, the container flange 17 has a rising inclined flank on the side facing the separating wall flange 15, over which flank the separating wall flange 15 is pressed so that it is bent gently (see FIG. 3c).

Figure 2:
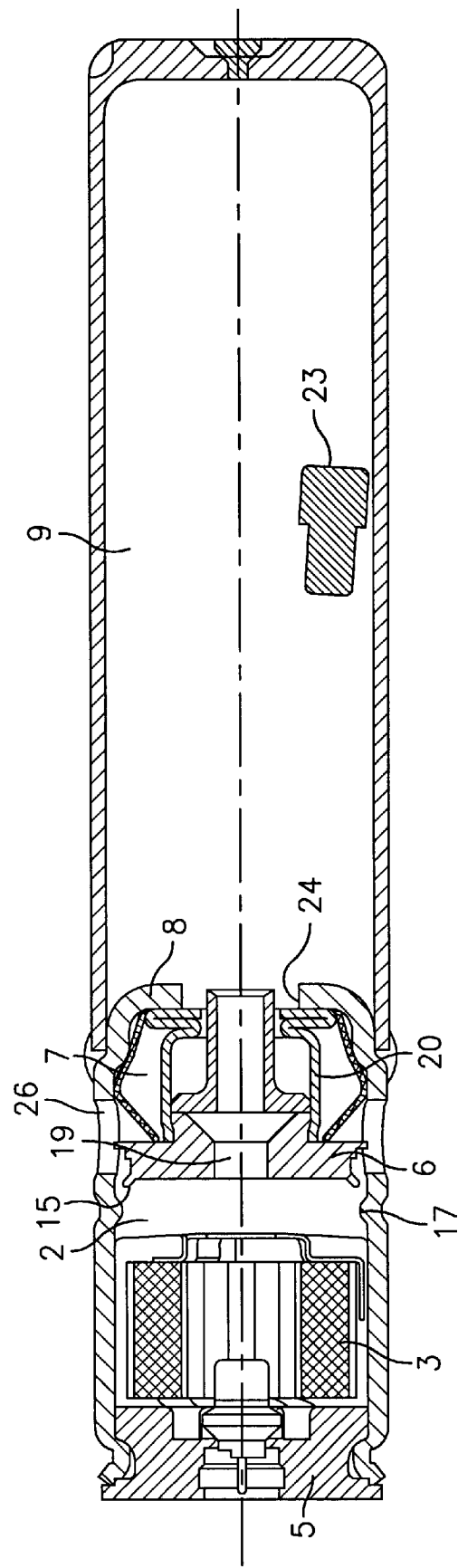
FIG. 2: A longitudinal cross-section through the inflation device similar to FIG. 1, where the inflation device is shown after gas ignition, after a separating wall between the charge chamber and the discharge chamber has failed, and after a sealing stopper has been driven out of its position sealing an inside opening in the separating wall.
Figure 4A:
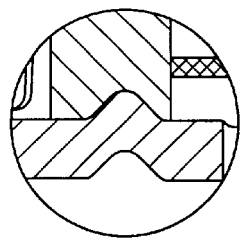
FIG. 4: is a cutaway depiction of a connection between the separating wall and the container wall according to the state of the art, similar to the depiction in FIG. 3.

As FIG. 2 shows, upon pressing the separating wall 6 into the discharge chamber 7, the guide piece 20 is flattened. The energy acting on the separating wall 6, or at least a part thereof, is absorbed and damped by this. The collar 27 also deforms. The collar 27 and well as the guide piece 20 are shortened along their axial length.

The flange connection between the separating wall 6 and the container wall 4 is dimensioned and formed such that the axial failure of the separating wall is facilitated without deformation of container wall 4, particularly without radial expansion of the container wall 4. Furthermore, the connection between the separating wall 6 and the container wall 4 is elastic, such that the separating wall 6 always fails before exterior wall 5. The interior separating wall flange 15 of the separating wall 6 is less resistant than the interior exterior wall flange 13 of exterior wall 5. This guarantees that even in case of excessive pressure, the exterior wall 5 does not burst but rather that the gas always expands on the predetermined path through the discharge openings 26.

The seal for the connecting opening in the separating wall between the pressure chamber and the discharge chamber can, if necessary, be released, i.e., opened, by destruction of the seal.

What is claimed is:

1. Inflation device for automobile safety equipment having:
    a container (1) in which a charge chamber (2) for acceptance of a gas-producing charge (3) and a discharge chamber (7) having a discharge opening (26) arranged to communicate with safety equipment, are arranged,
    a separating wall (6) having an inside opening (19) structured and arranged to separate the two chambers (2,7) from each other in an axial direction of said container (1), and
    interlocking connecting means (15,16,17) structured and arranged to connect said separating wall (6) fluid-tightly with a wall (4) of the container (1),
    wherein the connecting means (15,16,17) are formed elastically and arranged such that said connecting means only fail in the axial direction when a predetermined pressure is reached in the charge chamber (2) and the separating wall (6) is structured and arranged to move in the axial direction within the discharge chamber (7).

2. Inflation device according to claim 1, wherein said connecting means are formed as a flange connection (15, 16,17), having a flange (17) on said container wall (4) structured and arranged to point radially inwardly and a separating wall flange (15) pointing radially outwardly from said separating wall (6) and cooperating with said container flange (17),
    said separating wall flange (15) structured and arranged elastically in the axial direction.

3. Inflation device according to claim 2, wherein said container flange (17) is integrally formed with said container wall (4), as a radially, pressed-in recess projecting radially inwardly from said container wall (4).

4. Inflation device according to claim 2, wherein the separating wall flange (15,16) is integrally formed with the separating wall (6) as a ring-like, circumferential ridge at an exterior circumference of the separating wall (6), forming a theoretical deformation point in the flange connection (15, 16,17).

5. Inflation device according to claim 1, wherein said discharge opening (26) of said discharge chamber (7) has a larger cross-section than the inside opening (19) in the separating wall (6).

6. Inflation device according to claim 1, wherein the discharge opening (26) of the discharge chamber (7) is formed through said container wall (4) and points radially outwardly.

7. Inflation device according to claim 1, additionally comprising an exterior wall (5) on a side of said charge chamber (2) opposite said separating wall (6), said exterior wall (5) being formed separately from said container wall (4) and coupled therewith by fluid-tight connecting means (12,13,14), wherein said connecting means (12,13,14) for said exterior wall (5) is structured and arranged to be more resistant than said connecting means (15,16,17) for said separating wall (6) with said container (1).

8. Inflation device according to claim 7, wherein said connecting means (12,13,14) for said exterior wall (5) are formed as flange connections having a flange (13) on said exterior wall (5) pointing radially outwardly, and a flange (14) on said container wall (4) pointing radially inwardly and cooperating with the exterior wall flange (13).

9. Inflation device according to claim 8, wherein said container wall flange (14) is arranged on a side of said exterior wall flange (13) facing away from said charge chamber (2).

10. Inflation device according to claim 8, wherein said connecting means (12,13,14) for said exterior wall (5) is formed as an interlocking connection with the container wall (4) in both opposite axial directions.

11. Inflation device according to claim 1, wherein said container wall flange (17) is arranged on a side of said separating wall flange (15) facing away from said charge chamber (2).

12. Inflation device according to claim 11, wherein said container flange (17) comprises a rising inclined flank on a side facing one (15) of the separating wall flanges (15,16) and over which said respective separating wall flange (15) is pressed to be bent in an axial direction upon ignition whereby said respective separating wall flange (15) deforms or fails in the axial direction.

13. Inflation device according to claim 1, wherein said connecting means (15,16,17) for the separating wall (6) is formed as an interlocking connection with the container wall (4) closed in both opposite axial directions.

14. Inflation device according to claim 1, additionally comprising:

a pressure chamber (9) provided for compressed gas and structured and arranged to be connected with said discharge chamber (7), a connecting opening (24) structured and arranged for communicating an interior of said pressure chamber (9) with said discharge chamber (7), and a releasable seal (25) structured and arranged for fluid-tightly sealing said connecting opening (24), said releasable seal (25) being formed and arranged to be released by gas pressure in said discharge chamber (2) after ignition of the gas-producing charge (3) therein.

15. Inflation device according to claim 14, additionally comprising a stopper (23) structured and arranged to plug the inside opening (19) in the separating wall (6), said stopper (23) structured and arranged to release said opening (19) by being movable out from said inside opening (19) in a direction of said connecting opening (24) between said discharge chamber (7) and pressure chamber (9), such that seal (25) in said connecting opening (24) is opened by said movable stopper (23).

16. Inflation device according to claim 14, additionally comprising a separating wall (8) situated between said discharge chamber (7) and pressure chamber (9), with said separating wall (6) situated between said charge chamber (2) and said discharge chamber (7) being supported thereon.

17. Inflation device according to claim 1, additionally comprising a symmetrical guide (20) extending in the axial direction and structured and arranged to support said separating wall (6) and being radially distanced from said container wall (4), said guide (20) structured and arranged to be deformed or flattened in the axial direction.

18. Inflation device according to claim 17, wherein said guide (20) comprises a theoretical deformation zone formed as a radially inwardly pointed bead (22).

19. Inflation device according to claim 1, wherein said container (1) is formed essentially as a cylinder and said chambers (2,7) are concentrically arranged one after the other within said container (1) along a cylindrical axis thereof.

20. Inflation device according to claim 1, being built into automobile safety equipment, particularly an air bag arrangement.

21. Inflation device according to claim 1, wherein said connecting means (15,16,17) comprise two separate ring-shaped wall flanges (15,16) projecting radially outwardly and spaced at a distance from one another upon an exterior circumference of said separating wall (6), a flange (17) extending from the wall (4) of the container (1) radially inwardly between the separate wall flanges (15,16) and projecting as a bead toward the inside, such that at least one gap is defined between said respective flanges (15,16,17) in unignited condition.

22. Inflation device according to claim 1, wherein said connecting means (15,16,17) comprises a pair of flanges (15,16) extending radially outwardly from an outer circumferential edge of said separating wall (6) and axially spaced from one another, a flange (17) extending radially inwardly from the container wall (4) between said flange pair (15,16) and with a gap appearing between said flange pair (15,16) in unignited condition, such that upon ignition, when pressure within said charge chamber (2) exceeds a predetermined value, one (15) of said flange pair (15,16) facing said charge chamber (2) deforms or fails in the axial direction and said separate wall (6) is pressed in the axial direction with the said flange (15) being bent in the axial direction and thrust over said container wall flange (17) which is provided with a rising inclined flank on a side facing said flange (15) and over which said flange (15) is pressed to be bent gently.

23. Inflation device for automobile safety equipment having:

a container (1) in which a charge chamber (2) for acceptance of a gas-producing charge (3) and a discharge chamber (7) having a discharge opening (26) arranged to communicate with safety equipment, are arranged, a separating wall (6) having an inside opening (19) structured and arranged to separate the two chambers (2,7) from each other in an axial direction of said container (1), interlocking connecting means (15,16,17) structured and arranged to connect said separating wall (6) fluid-tightly with a wall (4) of the container (1), an exterior wall (5) on a side of said charge-chamber (2) opposite said separating wall (6), said exterior wall (5) being formed separately from said container wall (4) and coupled therewith by fluid-tight connecting means (12,13,14), and wherein said connecting means (12,13,14) for said exterior wall (5) is structured and arranged to be more resistant than said connecting means (15,16,17) for said separating wall (6) with said container (1) such that, upon ignition, said separating wall (6) always fails before said exterior wall (5).

24. The inflation device of claim 23, wherein the connecting means (15,16,17) for said separating wall (6) are formed elastically and arranged such that said connecting means (15,16,17) only fail in the axial direction when a predetermined pressure is reached in the charge chamber (2) and the separating wall (6) is structured and arranged to move in the axial direction within the discharge chamber (7).

* * * * *